United States Patent [19]

Shenk

[11] Patent Number: 4,663,667

[45] Date of Patent: May 5, 1987

[54] CONTRAST CONTROL CIRCUIT

[75] Inventor: Edwin K. Shenk, Westford, Mass.

[73] Assignee: Polaroid Corporation, Cambridge, Mass.

[21] Appl. No.: 801,689

[22] Filed: Nov. 25, 1985

[51] Int. Cl.$^4$ .............................................. H04N 5/57
[52] U.S. Cl. .................................... 358/169; 358/168; 358/284
[58] Field of Search ............... 358/280, 284, 168, 169, 358/166

[56] References Cited

U.S. PATENT DOCUMENTS 3,804,981 4/1974 Avins .................................. 358/168
4,213,155 7/1980 Miienchow ........................ 358/284
4,279,003 7/1981 Schulz ................................ 358/284

Primary Examiner—Tommy P. Chin
Attorney, Agent, or Firm—Edward S. Roman

[57] ABSTRACT

A contrast control circuit for use in an electronic image printing system for adjusting the contrast of an analog electronic image information signal without changing the maximum and minimum brightness levels thereof in order to maintain the exposure of a photosensitive material such as photographic film within its determined range of sensitivity.

6 Claims, 6 Drawing Figures

CONTRAST CONTROL CIRCUIT

BACKGROUND OF THE INVENTION

1. Field of the Invention

This invention relates generally to a contrast control circuit and, more particularly, to a contrast control circuit for adjusting the contrast of an analog electronic image information signal without changing its brightness range.

2. Description of the Prior Art

Electronic image printing devices for electronically printing an image on a photosensitive material such as a photographic film are well known in the art. Such devices may utilize a cathode ray tube (CRT) which responds to an analog electronic image information signal to expose a photosensitive material and thereby record the desired image. Alternatively, photosensitive materials may be exposed by laser beams scanned across the face thereof or light emitting diode arrays both of which are well known in the art. In addition, other means for converting an analog electronic image information signal to a hard copy by exposing a photosensitive material to either light or thermal energy are well known in the art.

Such photosensitive materials and in particular photographic films have determinate ranges of sensitivity to which the exposing light or thermal energy must be matched thereby requiring the exposure to take place within a select range of brightness values. However, it may also be desirable to vary the contrast of the image recorded on the photosensitive material which generally cannot be achieved without having some effect on the brightness range to which the photosensitive materials are exposed.

Therefore, it is a primary object of this invention to provide a contrast control circuit for use in an electronic image copying system for adjusting the contrast of an analog electronic image information signal without changing the brightness range thereof.

It is a further object of this invention to provide a contrast control circuit for use in an electronic image printing system for adjusting the contrast of an analog electronic image information signal without changing the selected maximum and minimum brightness levels thereof thereby maintaining the exposure of a photosensitive material such as photographic film within its selected range of sensitivity.

Other objects of the invention will be in part obvious and will in part appear hereinafter. The invention accordingly comprises a circuit possessing the construction, combination of elements and arrangement of parts which are exemplified in the following detailed disclosure.

SUMMARY OF THE INVENTION

A contrast control circuit is provided for adjusting the contrast of an analog electronic image information signal without changing the select maximum and minimum brightness levels of the analog electronic image information signal. The contrast control circuit comprises means for receiving an input analog electronic image information signal for amplification in a non-linear manner. The input analog electronic image information signal is also combined with the non-linearly amplified analog electronic image information signal in a manner to provide a first modified analog electronic image information signal corresponding to the difference between the non-linear amplified analog electronic image information signal and the input analog electronic image information signal. Means are provided for receiving the first modified analog electronic image information signal for amplification in a select linear manner and for combining the linearly amplified first modified analog electronic image information signal with the non-linearly amplified analog electronic image information signal in a manner to provide a second modified analog electronic image information signal corresponding to the difference between the non-linearly amplified analog electronic image information signal and the linearly amplified first modified analog electronic image information signal. Means are provided for receiving the second modified analog electronic image information signal for amplification in a select linear manner to provide an output analog electronic image information signal, the contrast of which may be selectively varied in correspondence with the select linear manner in which the amplification of the first modified analog electronic information signal is varied.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
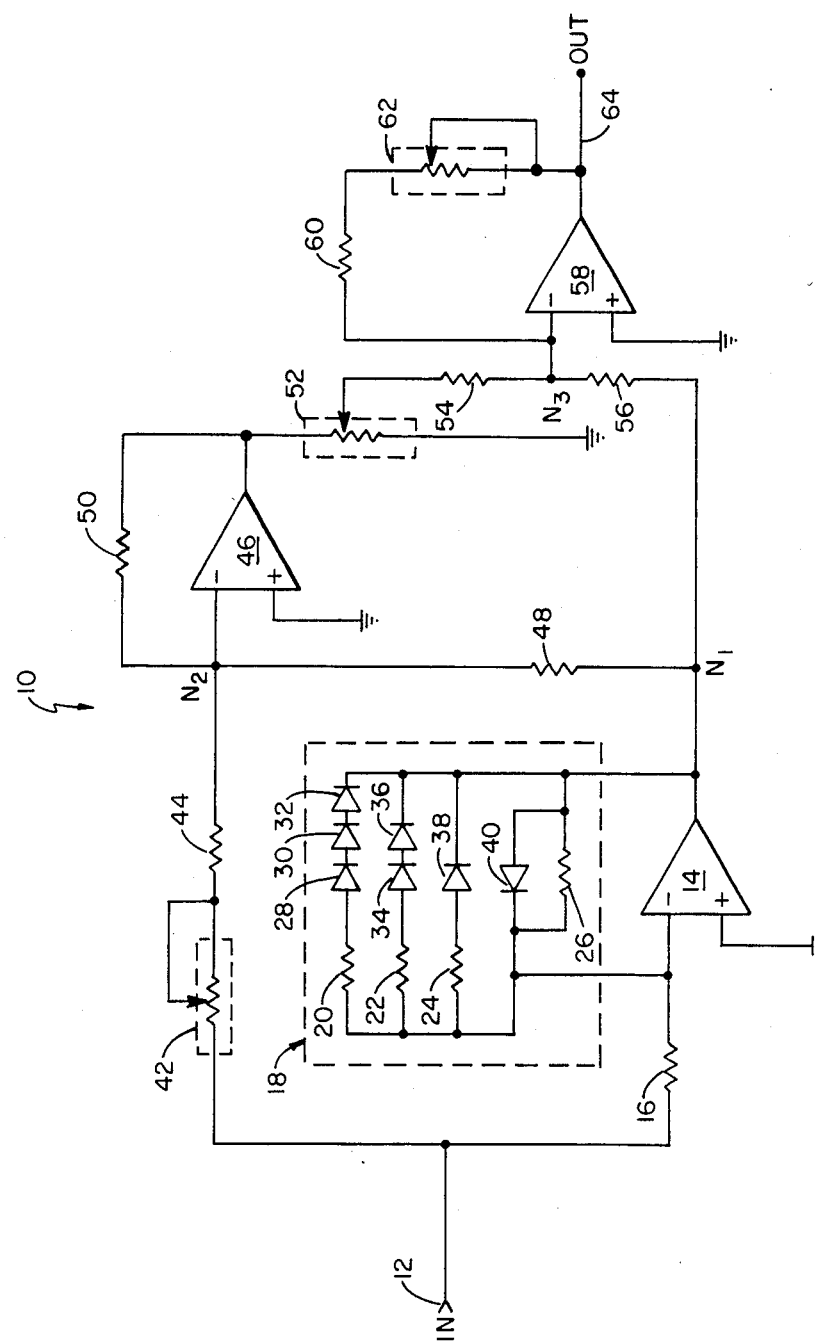
FIG. 1 is a schematic circuit diagram of the contrast control circuit of this invention.

Referring now to FIG. 1, there is shown generally at 10 the contrast control circuit of this invention comprising an input terminal 12 for receiving an analog electronic image information signal. The input terminal 12 connects by way of an input resistor 16 to the negative input terminal of a first operational amplifier 14, the positive input terminal to which is grounded. A feedback network as shown generally at 18 connects the negative input terminal of the operational amplifier 14 to the output terminal. The feedback network 18 comprises a first resistor 20 in serial connection with three diodes 28, 30 and 32, a second resistor 22 in serial connection with two diodes 34 and 36, a third resistor 24 in serial connection with one diode 38 and a fourth resistor 26 in parallel connection with one diode 40. Thus, there are provided four distinct feedback paths which are biased into conduction at different times in a manner as will be fully described in the following discussion.

The output signal from the operational amplifier 14 at node $N_1$, in turn, is directed by way of a resistor 48 to node $N_2$. The input terminal 12 also connects by way of a calibration potentiometer 42 and series resistor 44 to the node $N_2$. The node $N_2$ is also in common connection with the negative input terminal of a second operational amplifier 46, the positive input terminal to which is grounded. The operational amplifier 46 has a fixed feedback resistor 50 connected from the negative input terminal thereof at node $N_2$ to the output terminal thereof. The output terminal from the operational amplifier 46, in turn, connects to one side of a contrast control potentiometer 52 of which the other side is grounded as shown in the drawing. The variable slider of the potentiometer 52, in turn, connects by way of a resistor 54 to node $N_3$ which also is connected to the node $N_1$ by way of an interconnecting resistor 56. The node $N_3$, in turn, connects to the negative input terminal of a third operational amplifier 58, the positive input terminal to which is grounded. The operational amplifier 58 has a feedback network comprising a brightness control potentiometer 62 in serial connection with a resistor 60. The output from the operational amplifier 58 provides the output analog electronic image information signal in which the brightness and contrast are selectively varied in the manner of this invention to be now described.

Figure 2A:
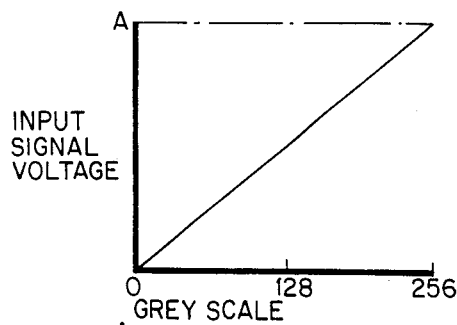
FIGS. 2A–2E show, respectively, the response curves for the analog electronic image information signal voltage levels versus grayscale at various nodes and terminals of the contrast circuit of FIG. 1.

Referring now to FIGS. 2A–2E and in particular FIG. 2A, there is shown a graphical representation for the response characteristic of the input signal voltage level of the analog electronic image information signal versus grayscale. As will be readily understood by those of ordinary skill in the art, the grayscale comprises a series of gray tones extending in regular steps of increased scene depth of tone from light or clear, as shown at 0, to black or opaque, as shown at 256. Thus, the correlation between the voltage level of the input analog electronic image information signal and the grayscale of the photosensitive material upon which the image is to be ultimately produced is linear.

Figure 2B:
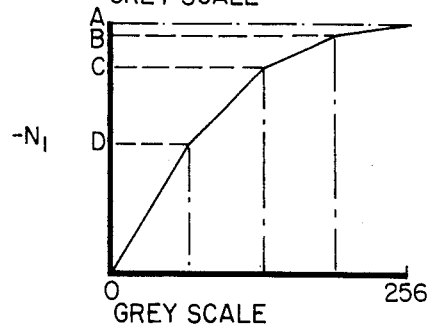
Figure 2C:
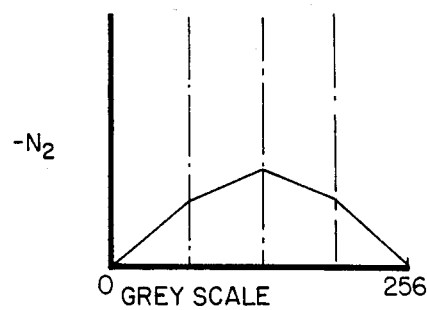

The input analog electronic image information signal is amplified in a non-linear manner by the operational amplifier 14 and its associated feedback network 18 so as to provide the output response as shown in FIG. 2B. As will be readily understood, the operational amplifier 14 is connected in a manner so as to invert the voltage polarity of the output signal so that the graph of FIG. 2B shows the negative response at node $N_1$. As is readily apparent from the graph of FIG. 2B, the non-linear gain characteristic is initially linear for voltage levels of the analog electronic image information signal from 0 volts to D volts whereupon at voltage level D the slope of the linear gain characteristic changes. The slope of the linear gain characteristic then remains constant between the analog electronic image information signal voltage levels D and C again changing at voltage level C. The slope of the linear gain characteristic thereafter remains constant between the analog electronic image information signal voltage levels C and B again changing at voltage level B and remaining constant until reaching the highest voltage level A.

Thus, it can be seen that the non-linear gain characteristic of the operational amplifier 14 comprises four distinct segments of linear gain characteristic having different slopes with each linear gain characteristic corresponding to a determined range of analog electronic image information signal voltage levels. The first linear gain characteristic in the range of analog electronic image information signal voltages from 0 to D occurs prior to the feedback diodes 28, 30, 32, 34, 36 and 38 being sufficiently forwardly biased to conduct. Diode 38 is forwardly biased into conduction when the analog electronic image information signal voltage level reaches level D to change the slope of the linear gain characteristic. Similarly, the slope of the linear gain characteristic is again changed when the analog electronic image information signal level reaches level C so as to bias the diodes 34 and 36 into forward conduction. In like manner the slope of the linear gain characteristic is again changed when the analog electronic image information signal level reaches level B so as to bias the diodes 28, 30 and 32 into forward conduction. Although four linear gain characteristic slopes are illustrated, it will be well understood that the non-linear gain characteristic can be divided into any number of linear gain segments depending upon the number of serially connected resistors and diodes that are parallel connected in the feedback network 18. It will also be well understood that other types of well-known feedback networks could alternatively be used to establish a non-linear gain characteristic of the operational amplifier 14 as shown graphically in FIG. 2B.

The output analog electronic image information signal from the operational amplifier 14, in turn, is directed by way of resistor 48 to node $N_2$ for combination with the input analog electronic image information signal which is directed to node $N_2$ by way of calibration potentiometer 42 and series resistor 44. The response curve for the combined analog electronic image information signal at node $N_2$ is shown graphically in FIG. 2C where as a result of the aforementioned polarity inversion provided by the operational amplifier 14, the voltage level of the ordinate is illustrated in negative polarity. The analog electronic image information signal at node $N_2$ is thereafter linearly amplified and inverted by the operational amplifier 46 in cooperation with feedback resistor 50. The output signal from the operational amplifier 46, in turn, is directed to the contrast control potentiometer 52 from whence a select proportion of the voltage signal level is directed by way of the potentiometer 52 slider and series resistor 54 to node $N_3$.

Figure 2D:
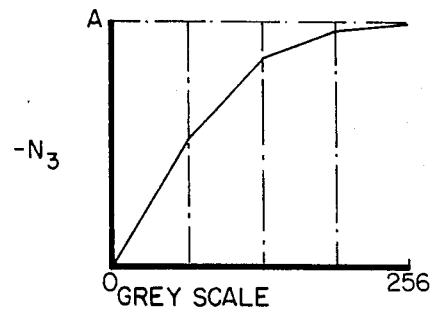

The non-linearly amplified analog electronic image information signal output from the operational amplifier 14 is also directed by way of the series resistor 56 to node $N_3$ for combination with the output signal from the operational amplifier 46 to provide the output response curve as shown in FIG. 2D. Again, as will be readily understood, since the operational amplifiers 14 and 46 both operate to invert the polarity of the input signals thereto, the voltage level response curve of FIG. 2D is shown as having its polarity inverted. The analog electronic image information signal at node $N_3$, in turn, is directed to the negative input terminal of the operational amplifier 58 which operates to impose a linear gain transfer characteristic thereto to provide the output analog electronic image information signal as shown at the terminal 64.

Figure 2E:
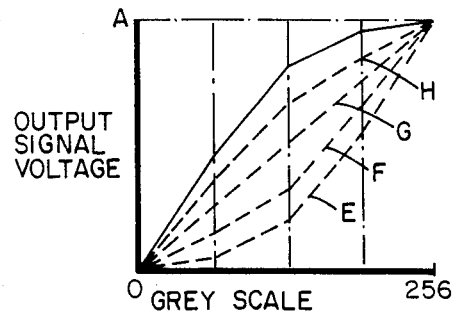

The response curve for the output analog electronic image information signal is shown in solid lines in FIG. 2E and may be varied within the envelope defined between the solid line response curve and the phantom line response curve as shown at E. As will now become readily apparent, the appropriate response curve as defined between the limits as shown in FIG. 2E may be selectively chosen by appropriately adjusting the variable contrast control potentiometer 52 which effectively determines the gain of the operational amplifier 46. Thus, under conditions where a low contrast is required, the slider of the potentiometer 52 is adjusted to achieve the lowest resistance connection to the output terminal from the operational amplifier 46 thereby in effect increasing the gain of the operational amplifier to provide the solid line output response as shown in FIG. 2E. It will be readily understood that reducing the slope of the response curve of FIG. 2E toward the white end of the grayscale while simultaneously increasing the slope of the response curve toward the black end of the grayscale will operate to achieve a low contrast. Conversely, if a high contrast is desired, the slider of the potentiometer 52 is adjusted to provide the maximum resistance from the output of the operational amplifier 46 thereby in effect reducing the gain of the operational amplifier 46 to provide the output response as shown at phantom line at E of FIG. 2E. It will be readily understood by those having ordinary skill in the art that the response curve E of FIG. 2E having a high slope toward the white end of the grayscale and a low slope toward the dark or black end of the grayscale effects an increase in the contrast of the output analog electronic image information signal. It will also be well understood that any intermediate contrast may also be provided by adjusting the slider of the potentiometer 52 at the appropriate intermediate positions to provide the response curves as shown at phantom lines at F, G and H. The linear response curve of FIG. 2A can also be duplicated as shown by the phantom line G upon the appropriate intermediate setting for the slider of the potentiometer 52.

It will also be appreciated from FIG. 2E that the variation in contrast can be achieved without a change in the maximum and minimum brightness levels as shown at 0 and A, respectively. The 0 or black brightness level is fixed; however, the maximum or white brightness level as shown at A may be varied by adjusting the brightness control potentiometer 62 to vary the linear gain characteristic of the operational amplifier 58. The brightness control is accomplished entirely independently of the contrast control without effecting the contrast control settings regardless of whether the contrast control potentiometer 52 slider is adjusted to its maximum or minimum settings or any other intermediate setting. Thus, in this manner, there is provided a means for adjusting both the contrast and brightness of an analog electronic image information signal entirely independent of each other as is particularly advantageous in electronic imaging devices which expose photosensitive materials of determinate light sensitivity characteristics to provide hard copy.

It will be well understood that although the operational amplifiers 14, 46 and 58 have been described as being connected to invert the polarity of the signals input thereto, it will be equally apparent that invertors apart from the operational amplifiers could be utilized and the operational amplifiers could be connected so as not to effect the polarity inversions as described. In addition, instead of connecting the operational amplifiers to effect polarity inversion or using separate invertors, it would be possible to substitute subtractors at the appropriate nodes where signal combinations occur.

Other embodiments of the invention including additions, subtractions, deletions and other modifications of the preferred disclosed embodiments of the invention will be obvious to those skilled in the art and are within the scope of the following claims.

What is claimed is:

1. A contrast control circuit for adjusting the contrast of an input analog electronic image information signal without changing select maximum and minimum brightness levels for said analog electronic image information signal, said contrast control circuit comprising:

means for receiving said input analog electronic image information signal for amplification in a non-linear manner;

a first means for combining the non-linearly amplified analog electronic image information signal with the input analog electronic image information signal in a manner to provide a first modified analog electronic image information signal corresponding to the difference between the non-linearly amplified analog electronic image information signal and the input analog electronic image information signal;

means for receiving the first modified analog electronic image information signal for amplification in a select linear manner;

a second means for combining the select linearly amplified first modified analog electronic image information signal with the non-linearly amplified analog electronic image information signal in a manner to provide a second modified analog electronic image information signal corresponding to the difference between the non-linearly amplified analog electronic image information signal and the linearly amplified first modified analog electronic image information signal;

means for receiving the second modified analog electronic image information signal for amplification in a select linear manner to provide an output analog electronic image information signal; and means for selectively varying the contrast of said output analog electronic image information signal in correspondence with the select linear manner in which the first modified analog electronic image information signal is amplified.

2. The contrast control circuit of claim 1 wherein said means for amplifying in a non-linear manner comprises a first operational amplifier and a feedback network operative to change the gain characteristic of said first operational amplifier in a non-linear manner.

3. The contrast control circuit of claim 2 wherein said feedback network comprises a plurality of serially connected resistors and diodes connected in parallel relation with respect to each other.

4. The contrast control circuit of claim 2 wherein said means for amplifying the first modified analog electronic image information signal comprises a second operational amplifier and said means for selectively varying the contrast comprises a variable output resistor that may be selectively adjusted to determine said select linear manner of amplification.

5. The contrast control circuit of claim 4 wherein said means for amplifying the second modified analog electronic image information signal comprises a third operational amplifier and a variable feedback resistor that may be selectively adjusted to determine the maximum brightness level for the output analog electronic image information signal.

6. The contrast control circuit of claim 5 wherein said first, second, and third operational amplifiers operate to invert the polarity of the output signals therefrom.

* * * * *